United States Patent
Kleinman

[19]

[11] Patent Number: 6,128,640
[45] Date of Patent: *Oct. 3, 2000

[54] METHOD AND APPARATUS FOR USER-LEVEL SUPPORT FOR MULTIPLE EVENT SYNCHRONIZATION

[75] Inventor: Ronald J. Kleinman, Santa Clara, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,073

[22] Filed: Oct. 3, 1996

[51] Int. Cl.[7] ........................................... G06F 9/00
[52] U.S. Cl. ............................ 709/102; 709/106
[58] Field of Search .................... 395/647, 646; 709/100, 102, 103, 105, 106, 107, 223, 243, 227; 370/254, 389

[56] References Cited

U.S. PATENT DOCUMENTS

| | | | |
|---|---|---|---|
| 5,430,875 | 7/1995 | Ma | 395/650 |
| 5,509,123 | 4/1996 | Dobbins et al. | 395/200.15 |

OTHER PUBLICATIONS

Draves et al Using Continuations to Implement Thread Management and Communications in Operating Systems, ACM 1991.

Oikawa et al, User–Level Real–Time Threads, Real–Time Operating Systems 1994 Workshop, IEEE pp. 7–11.

Inohara et al, Unstable Threads Kernel Interface for Minimizing the Overhead of Thread Switching, Parallel Processing 1993 Symposium pp. 149–155.

Inohara et al, A Thread Facility Based on User/Kernel Cooperation in the Xero Operating System, COMPSAC 1991 pp. 398–405.

Menon et al, Asynchronous Event Handling in Distributed Object–Based Systems, Distributed Computing Systems, 1993 Int. Conf. pp. 383–390.

Anderson et al, Scheduler activations:effective kernel support for the user level management of parallelism, ACM 1991.

*Primary Examiner*—Majid A. Banankhah
*Attorney, Agent, or Firm*—Townsend and Townsend and Crew LLP

[57] ABSTRACT

A system and method for emulating complete operating system support for synchronization of the execution of a process on multiple independent events. The emulation includes creating a thread and control; collecting representations of the different events into one container event, the occurrence of any one of the different events effecting the occurrence of the container event; waiting on the container event; suspending the execution of the thread; and after the occurrence of the container event, resuming the execution of the thread of control.

27 Claims, 4 Drawing Sheets

METHOD AND APPARATUS FOR USER-LEVEL SUPPORT FOR MULTIPLE EVENT SYNCHRONIZATION

BACKGROUND OF THE INVENTION

This patent document and the patent disclosure contain materials that are subject to copyright protection. The copyright owner has no objection to the facsimile reproduction by anyone of the patent document or the patent disclosure as they appear in the Patent and Trademark Office patent file or records but otherwise reserves all copyright rights whatsoever.

This invention relates to computer operating systems. More particularly, this invention relates to events and the synchronization of a program's execution to those events.

An understanding of certain computer operating system concepts is necessary to understand the invention. UNIX™ is taken as an example. (UNIX™ is described more fully in the Portable Operating System Interface, Part I (International Standard ISO/IEC 9945-1: 1990, IEEE Std 1003.1-1990, 1990) ("Posix"). Posix is incorporated herein by reference.)

In UNIX, a "process" or "thread of control" is the dynamic, run-time embodiment of a program. The program typically resides in a static state on a storage medium such as disk or ROM, while the process is loaded into memory and is executing. UNIX is a multitasking operating system: Many processes and threads can execute essentially simultaneously.

Many operating systems of the art and, particularly, all flavors of UNIX provide a process with the ability to synchronize its execution with the occurrence of some specific event.

Such an event might include the completion of a synchronous I/O operation, the asynchronous arrival of data from a remote client machine, the unlocking of a mutex, the exit of a thread or subprocess, etc. Each event traditionally has a corresponding notification mechanism through which a process can detect the actual occurrence of the event. Currently, however, there is no desirable mechanism to allow a process or thread running on such an operating system to synchronize on more than one event notification at the same time.

As an example of the problem, a process or thread might desire to suspend execution until either a resource (e.g., a specified mutex) becomes free and can then be acquired or until a request was received from a remote client, indicating that an I/O packet needs to be examined. Given that either of these events can occur first, that either occurrence must awaken the process or thread and that the process or thread can synchronize on only one of the events, then on which of these events should the process or thread block?

There are several standard approaches that partially solve this common problem: complete operating system support, timeouts, signals, selection, asynchronous I/O and threads. Each partial solution relies upon whatever functionality the operating system underlying the user program happens to provide. Each partial solution is examined in turn below.

COMPLETE OPERATING SYSTEM SUPPORT

Where available, this is often the best option for the application developer. The operating system provides the capability of synchronizing a process with a set of multiple, independent events. One example of complete operating system support is the WaitForMultipleObjects () routine in the Win32 Application Program Interface (API) running under the NT® operating system available from Microsoft Corporation of Redmond, Wash.

However, complete operating system support is not universally available in operating systems and, thus, is not universally available to processes that wish to synchronize on multiple, independent events.

Timeouts

Many operating systems provide a timeout capability, whereby a process or thread can be suspended (or put to sleep) and then resumed (or awakened) after a pre-specified time. In order to enable multiple, independent event synchronization given a timeout capability, a developer can incorporate timeouts into a facility that awakens the process or thread every n units of time. On each awakening, the process or thread checks whether any of a set of event notifications occurred. It loops back to sleep if in fact none did.

The problem with a timeout facility is that it substitutes polling for an asynchronous interrupt capability. This substitution has unfortunate effects that render it useless in any situation where either rapid response or overall performance is an issue.

If the sleep time is too long, program response suffers. Many events (I/O completion, client data arrival, critical region availability) occur frequently and lie along the critical performance paths of the programs that detect them. Delaying service to the next timeout results in an unacceptable detriment to program performance.

On the other hand, if the sleep time is too short, system response suffers. The overhead of rapidly waking up a series of processes or threads—only to have them execute code to check for event notifications and then return to sleep—results in a severe and unacceptable drain on system resources.

Signals

Various operating systems use signals to report on both synchronous and asynchronous events. In a given operating system, the types of signals are both predefined and limited. The range of possible events and the number of simultaneously active processes and threads, however, are not. The predefined and limited nature of signals rules out assigning a unique signal to each process or thread, which signal would be triggered when any of the event notifications for which the process or thread was waiting occurred.

There remains the technique of setting a signal to wake up all processes and threads when an event notification occurs. Such an implementation creates the real possibility of lost signals causing a process to shut down completely. Also, most multithreading implementations route a signal to only one thread that has blocked on it. This invalidates the latter approach.

Selection

The select () routine that many versions of Unix™ provide permits a process or thread to suspend execution until data arrives over one or more active sockets, each of which is connected to a remote client. This approach is extremely limited. The multiple events waited for must each be tied in some way to sockets or pipes. No other types of events can break out of the selects call.

Asynchronous I/O

Many operating systems offer asynchronous I/O capability. As an example, the Solaris® operating system, available from the assignee of the instant invention, provides asynchronous read (aioread()) and asynchronous write (aiowrite ()) routines. In essence, a signal notifies the process or thread that issues multiple asynchronous I/O requests when one or more of the requests complete.

This asynchronous approach can multiplex I/O operations. Other types of events do not generate this signal. The asynchronous I/O approach is accordingly too restrictive.

Threads

Multithreading is spreading among operating systems and appears intrinsically in many. For example, OS2® (available from International Business Machines Incorporated of Armonk, N.Y.), Solaris®, NT®, and HP UX® (available from Hewlett Packard of Cupertino, Calif.) each supports multithreading.

The current Posix multithreading standard, Portable Operating System Interface, Part I: System API—Amendment 2: Threads Extension (IEEE Std P1003.1c Draft 10, 1994) ("Posix.1c," incorporated herein by reference) provides an event wait capability (pthread_cond_wait()). A thread waits for any event notification (and, optionally, times out if the notification does not occur within a pre-specified time). However, these operating systems and Posix.1c do not support a thread's waiting on more than one event simultaneously.

SUMMARY OF THE INVENTION

The present invention provides an apparatus and method for simultaneously synchronizing execution of a thread or threads of control on M events. In one embodiment, the invention incorporates software executing at an operating system level and a user level. The invention includes creating at the user-level an M:N relationship between the multiple events and the thread(s), where N may be equal to 1. The M:N relationship may be used to suspend the execution of the thread(s), and to resume execution of the thread or thread.

DESCRIPTION OF THE PREFERRED EMBODIMENT

Although all coding examples below are in the C++ language, one of ordinary skill in the art will readily appreciate that any other general purpose programming language (C, Java®, SmallTalk, etc.) might have been chosen. Further, while the description and code examples employ the terminology of Posix and Posix.1c, the routine practitioner will understand that: Posix and Posix.1c are only instantiations of the more general operating system concepts that they represent.

Figure 1:
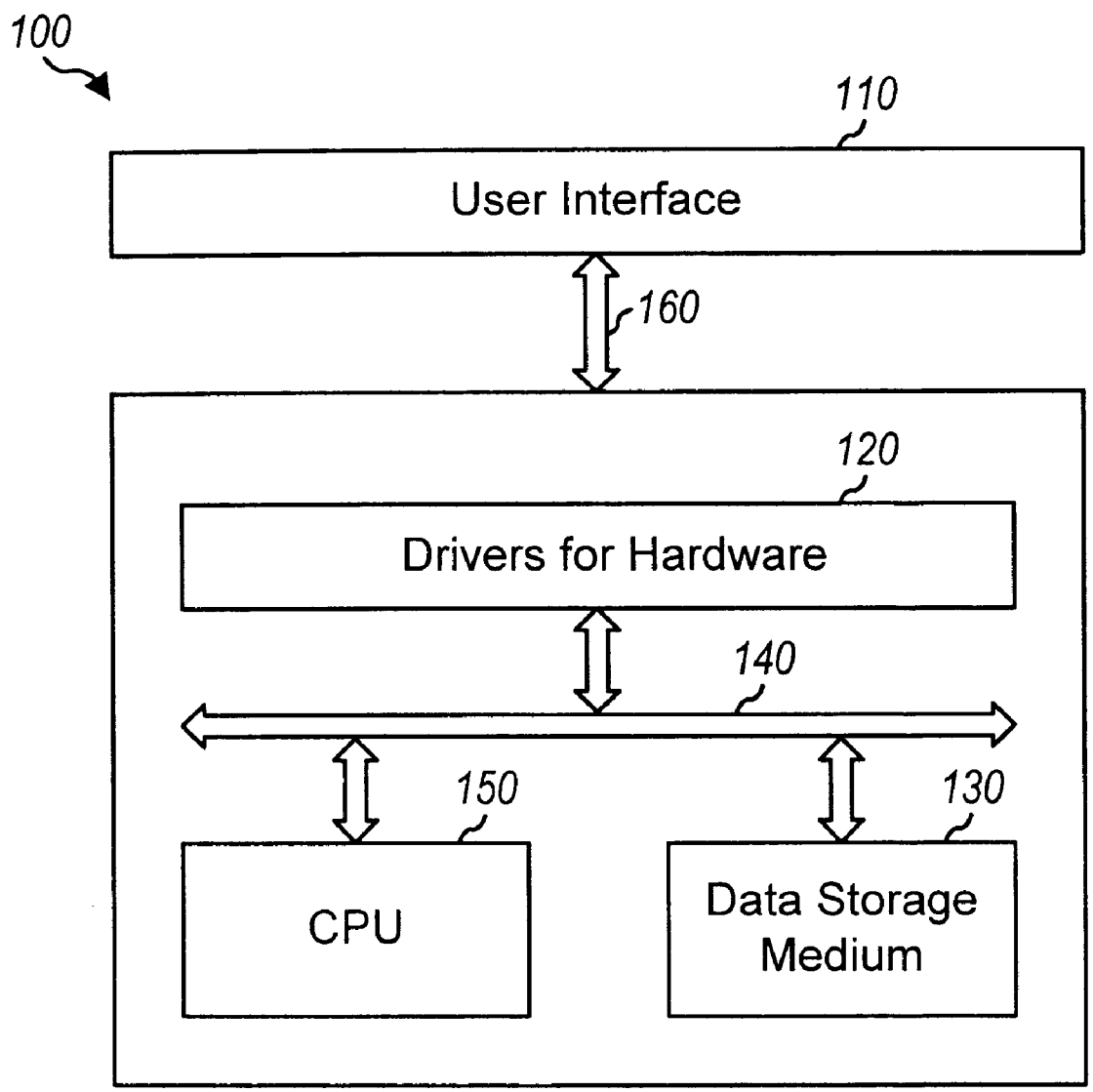
FIG. 1 is a schematic of a processor incorporating the invention.

FIG. 1 is a schematic of a processor 100 incorporating the invention. The processor 100 includes a CPU 150 and a data storage medium 130. The processor 100 also optionally includes drivers 120 interconnected by a bus 140 and a user interface 110 connected to the above components by a connector 160 as known in the art.

The data storage medium 130 typically includes an operating system (not shown) and at least one process (not shown), both of which execute on the CPU 150.

Overview

As the life cycle of a process—or, more correctly, the threads that compose the process—progresses, many events occur on which such a thread may desire to synchronize. Examples of such events include the exit of a subprocess, the exit of another thread, the completion of asynchronous file I/O, the arrival of a remote client message over the net and the freeing of a resource (indicated by another thread unlocking a Posix mutex or signalling or broadcasting on a Posix conditional).

In the prior art, synchronization involves having one (or more) of the threads wait ("block," "stop execution") until one such event occurs. When the event does occur, the event notification mechanism of the underlying operating system informs all (if any) threads that have been waiting for this event. Accordingly, the prior art provides an M:1 relationship between events and threads. Any number of threads can wait on one event.

By contrast, the instant invention creates at the user level an M:N relationship between threads and events. Each of M threads can block on any of N events, and each of N events can be waited for by M threads. An Alert object serves to associate Posix threads and the events for which the threads wait. M threads wait on an Alert object that may represent N different events:

M threads: One Alert object: N Events

The Alert class contains two internal collections Alerts, of which normally only one is active for any Alert object. Alert objects come in two types: container and contained. Each type may be "notified" when its event has occurred.

Container Alert Object

A container Alert object represents a single point of synchronization. It has a non-null collection of Alert objects, each of which corresponds to an event.

When a thread blocks on a single Alert object of the container type, the thread effectively waits on the logical inclusive OR of the events represented by all of the Alert objects in the container. The thread unblocks when any of these events occur.

As the container represents all events on which a thread may desire to synchronize at any particular point, a thread typically maintains only one such container. However, for simplicity of programming, a thread may maintain multiple such containers and wait on only the one of interest at any particular point.

Contained Alert Object

A contained Alert object represents a single event. It has a non-null collection of Alert objects including all of the container Alert objects that contain this Alert.

All event objects representing any type of event (the exit of a subprocess, the exit of another thread, etc.) notify their corresponding Alert object when their respective event occurs.

Once such a contained event Alert object is notified, it in turn notifies all container Alert objects of which it is a member. This in turn unblocks any thread that was blocked on the set of events represented by one of these containers.

By utilizing the same (Alert) class to handle both the container and contained cases, a single notification interface is maintained such that:

when a thread waits on its Alert, the thread unblocks when notification occurs on any of the contained events; and when an event notifies its Alert, all threads waiting on any set of events including this one event unblock.

This M:N relationship between Alert objects thus supports an operating system-independent M:N relationship between Posix threads and events.

Data Structures

The data structures and protocols used in a preferred embodiment to achieve the emulation of synchronization on multiple, independent events are described below.

Alert Class

The invention uses an Alert object to effect waiting and event notification A preferred implementation of the Alert class is given in Appendix A attached hereto.

Regarding event notification, the occurrence of some events can conceivably awaken a blocked thread. Such events include, for example, the completion of asynchronous I/O, the unlocking of a mutex, the exit of a subprocess or external thread, the expiration of a timer and the arrival of an unsolicited client request. For each event which can conceivably awaken a blocked thread, there is a corresponding Alert client. As explained further below, this Alert client uses an internal Alert object to post notification of its occurrence.

AlertCollection Class

With regard to waiting, a thread has the ability to block until notification is posted for a container Alert object representing a collection of Alert clients. Appendix B gives a sample interface for an AlertCollection object that could be used internally by the container Alert collection.

The AlertCollection class encapsulates the details of a collection of Alerts. The AlertCollection class may be an instantiation of a thread-safe collection template provided with any of a number of commercially available object libraries. "Tools.h++," available from the assignee of the instant invention, is one such object library.

A thread creates a container Alert object to serve as a container for a set of other Alert objects, each of which corresponds to a different event. By blocking until the Alert container object is notified, the thread, in effect, blocks until any of the Alerts in the container collection has been notified.

To enable this to occur, each Alert object internally incorporates two AlertCollection objects, container and contained, that are collections of Alerts. The first AlertCollection, container, represents the set of objects for which the instant Alert serves as a container. The second AlertCollection, contained, comprises the set of Alert objects that contain this Alert.

Figure 4:
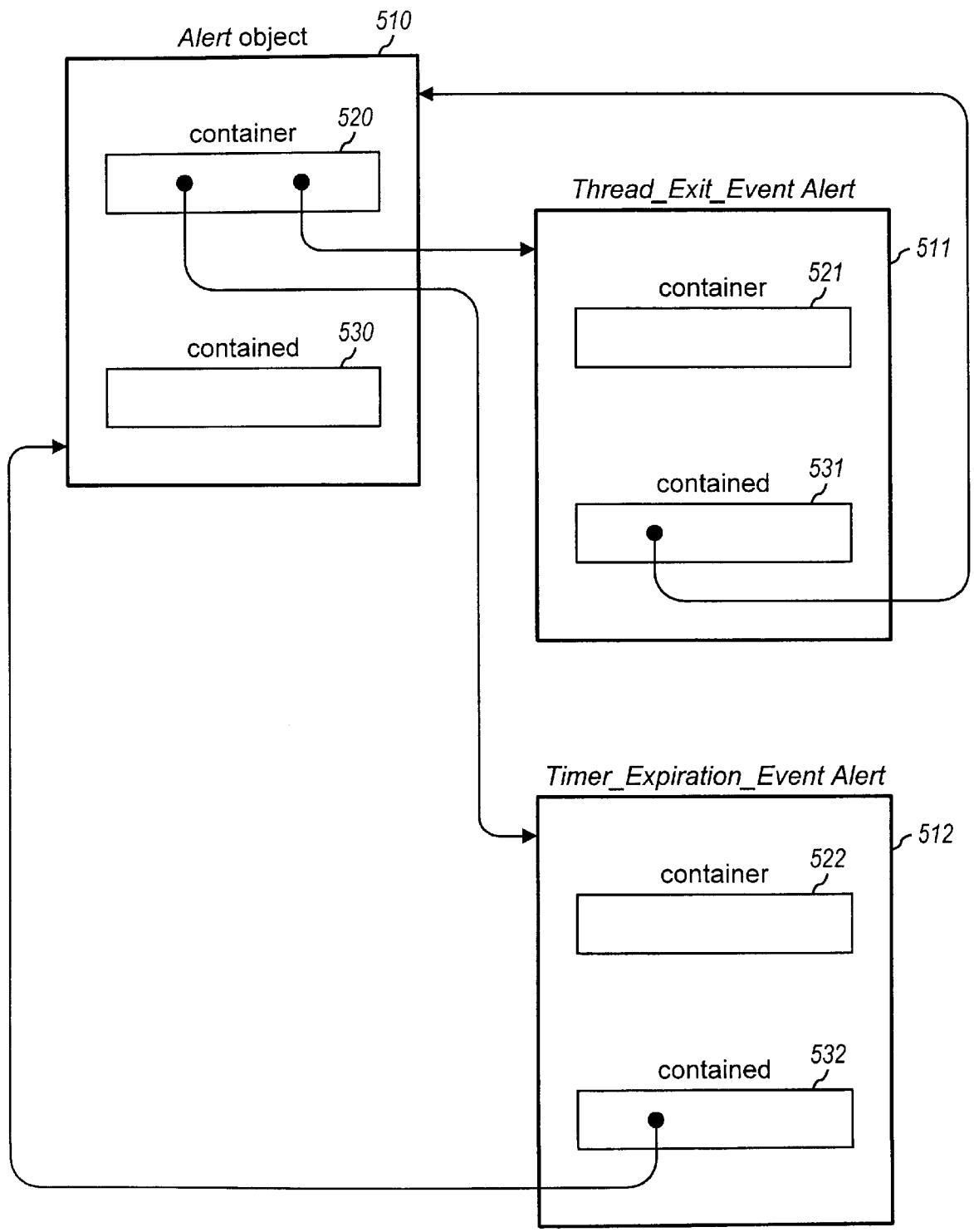
FIG. 4 graphically represents the relationship between the container and contained AlertCollections.

FIG. 4 graphically represents the relationship between the container and contained AlertCollections. In FIG. 4, an Alert object 510 has internal AlertCollections container 520 and contained 530. Likewise, the Thread__Exit__Event Alert 511 and the Timer __Expiration__Event Alert 512 each have internal AlertCollections container 521 and 522 and contained 531 and 532, respectively. In this example, the Alert object 510's container AlertCollection 520 contains both the Thread__Exit__Event Alert 511 and the Timer__Expiration__Event Alert 512. Accordingly, the contained AlertCollections 531 and 532 each show that its respective Alert 511 and 512 is contained in the container AlertCollection 520 of the Alert object 510.

Protocols

The Alert class has the following functions: is__awake(), make__member(), own(), notify__all() and wait__for__any(). Appendix A gives one possible implementation of these functions.

Table I lists which functions are typically used by which type of Alert object:

TABLE I

| Function | Alert type | |
| --- | --- | --- |
| | Container | Contained |
| is__awake( ) | ✓ | ✓ |
| make__member( ) | X | ✓ |
| own( ) | ✓ | X |
| notify__all( ) | X | ✓ |
| wait__for__any( ) | ✓ | X |

The routine is__awake() determines, for a specified contained Alert, whether the event corresponding to the Alert has been notified and, for a specified container Alert, whether any of the events waited for has been notified.

Make__member() takes a container Alert as input and adds it to the contained AlertCollection. Preferably, make__member includes n-level loop detection logic preventing an Alert from containing itself. Such logic is well within the known art. A one-level loop detector is illustrated here.

The own() routine receives a contained Alert as input and adds the event to the container AlertCollection of the this Alert and adds the this Alert to the contained AlertCollection of the specified Alert. Again, reasonable efforts to avoid loops are recommended.

Since all Alert object linkages are updated internally, this routine provides a straightforward programming interface. An application program can create a container Alert object and add Alert objects corresponding to the events to be waited for, via the own() routine.

The notify__all() routine notifies all Alerts that contain the instant Alert, as specified by contained. In a single-threaded manner via synchronization, notify__all() determines the number of Alerts in the contained collection. Notify__all() then gets each Alert one by one and invokes the gotten Alert's notify__all() routine to notify all of the Alerts that contain the gotten Alert. The this Alert is marked active and all threads currently blocked on the condition variable associated with the this Alert are unblocked.

Now when a thread has collected Alerts into a container Alert, it can wait for any one of them with the wait__for__any() routine of that container Alert.

In the sample interface, shown in Appendix B, the internal AlertCollection class supports array-like retrieval through the get() function, which takes an index offset. Alternative approaches include overlaying the "[]" operator and using another generic type of collection class.

The AlertCollection class also supports the addition and removal of Alerts, as well as the sizing of an AlertCollection. The implementation of the add(), get(), remove() and size() functions is straightforward and would normally be provided by the object library.

Scenario

Consider a thread which desires to synchronize on the exit of another thread or the expiration of a timer. This example scenario is explained here below in detail.

Figure 2A:
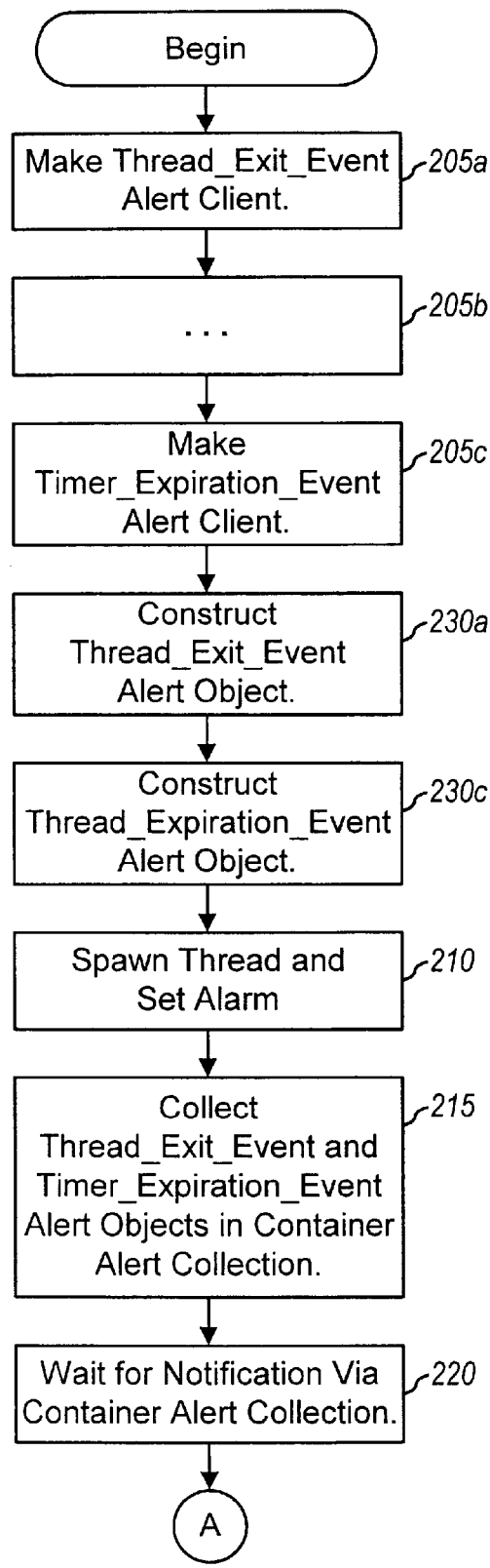
FIGS. 2A, 2B and 3 are charts of the flow of control according to one embodiment of the invention.
Figure 2B:
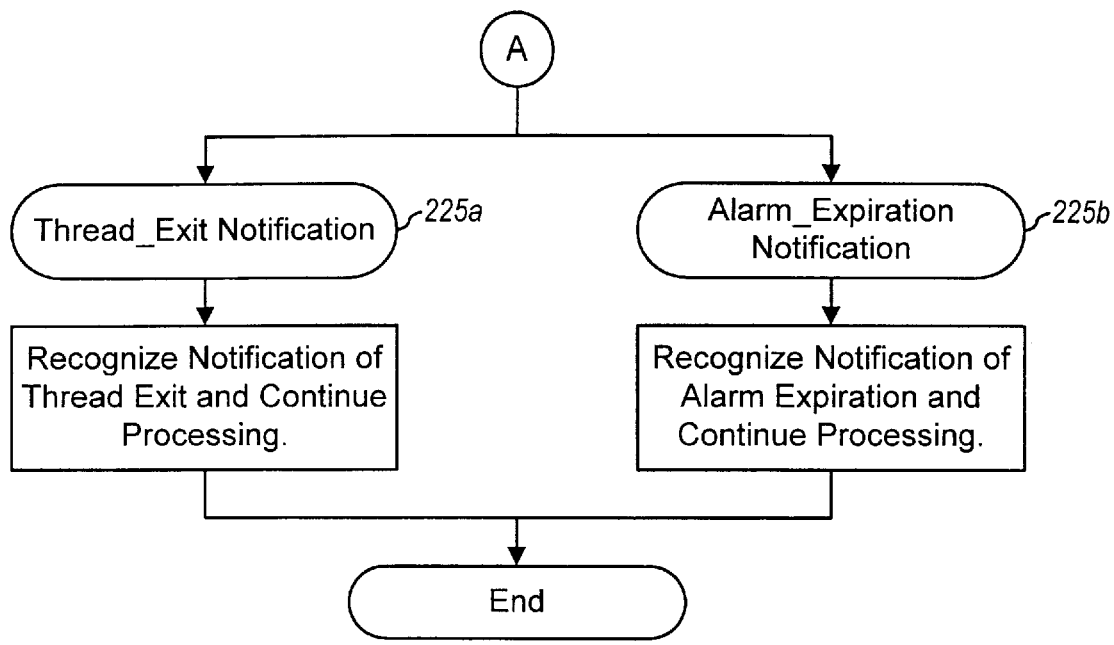
Figure 3:
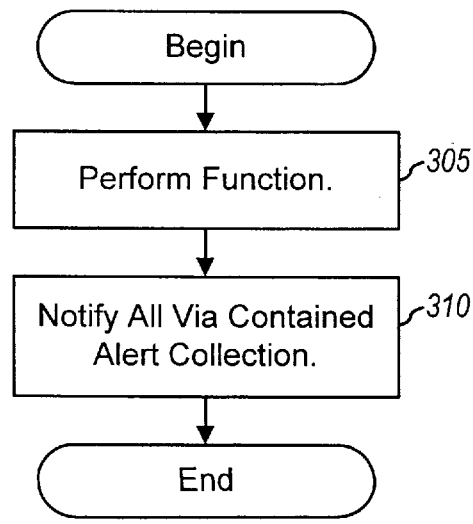

FIGS. 2A, 2B and 3 are charts of the flow of control according to one embodiment of the invention. The thread creates a Thread__Exit__Event Alert client, step 205a, and a Timer__Expiration__Event client, step 205c. Typically, a thread creates an event Alert client for each event for which the thread may desire to wait, step 205. Potential Alert clients include the freeing of a mutex, the expiration of a timer, the exit of a subprocess and the completion of an I/O operation.

Alerts and Alert clients are connected by placing an Alert object inside a client. Alternatively, the clients can inherit publicly from the Alert class.

Appendix C relates one embodiment of this Thread__Exit__Event Alert client. The implementation of the Timer__

Expiration_Event Alert client corresponds to the implementation of the Thread_Exit_Event.

Normally, to create and run a parallel thread of execution, the thread would call, for example, the Posix.1c pthread_create() routine or its equivalent in the operating system underlying the process. To take advantage of the invention, however, the application uses an alternative API. The alternative API would consist of constructing a Thread_Exit_Event object, step 230*a*, and running the Thread_Exit_Event object, step 210:

```
#include <pthread.h>
            // Thread attribute block (already set up).
    pthread_attr_t ta;
            // Function to execute in new thread.
    void * (*thread_function) (void *);
            // Parameter to pass to thread function.
    void *function_param;
        .
        .
        .
            // original Posix.1c client code:
    // pthread_create (&tid, thread_function,function_param);
            // new client code (allowing Posix thread exit
            // to be part of a set of
            // multiple events blocking another Posix
            // thread):
            //
            // Create Thread_Exit_Event object
            // (representing new Posix
            // thread).
    Thread_Exit_Event *thrd = new Thread_Exit_Event ( );
            // Start separate thread of execution.
    thrd->run (&ta, thread_function, function_param);
```

EXAMPLE 1

Application-Level Code That Starts a Parallel Thread.

Before or after the new thread has been created and launched, step 210, the application can add the event corresponding to the thread's exit to a heterogeneous list of such events to be waited for in a container Alert, step 215:

```
            // Alert to collect all events to wait for.
    Alert wait_for;
            // Add Thread's event notification to wait_for
            // list.
    wait_for.own (thrd->get_alert ( ));
```

EXAMPLE 2

Application-Level Code That Identifies the Exit of a Parallel Thread as an Event to Wait for.

Likewise, the process can set a timer, step 210, and add the event corresponding to a timer's expiration to that same heterogenous list of events to be waited for, step 215:

```
    Timer_Expiration_Event *tmr = new
        Timer_Expiration_Event( );
            // Add Timer_Expiration_Event's event
            // notification to wait_for
            // list.
    wait_for.own (tmr->get_alert( ));
```

EXAMPLE 3

Application-Level Code That Identifies Timer Expiration as an Event to Wait for.

When any thread blocks on the collection of events, e.g., by means of the Posix.1c pthread_cond_waito or alarm routines, step 220, that thread will unblock when any one of the collected Alerts occurs, step 225:

```
    wait_for.wait_for_any ( );
    // Continue processing after any one of awaited events
    // occurred.
        .
        .
        .
```

EXAMPLE 4

Application-Level Code That Waits for Either Thread Exit or Timer Expiration.

When any process invokes Thread_Exit_Event::run(), it passes the required Posix arguments: the pthread attribute block, ta, the address of the thread function, thread_function, and the thread parameter argument, function_argument. As the embodiment in Appendix C shows, the run() function uses the arguments to spawn a new Posix thread. Run() saves the supplied thread attribute block, function pointer and function argument; spawns a new Posix thread with the specified thread attribute block; and runs the static Thread_Exit_Event::wrapper function.

A new: Posix thread is thereby fired off, which executes the wrapper() function. Wrapper() in turn invokes the user-supplied function with the user-supplied argument, step 305.

When the function completes, control returns to the wrapper() function that invokes notify_all() on its Thread_Exit_Event object to unblock all threads waiting for this thread of control to exit, step 310.

Likewise, on its activation, the alarm notifies all of its Alert clients of its activation, steps 305 and 306.

Because the thread is waiting on the container Alert collection rather than any single contained Alert, either the thread-exit or timer-expiration event notification succeeds in unblocking the thread. Thus, the thread has synchronized on the first of two events that occurred. The user-level emulation of complete operating system support for synchronization on multiple, independent and heterogeneous notifications is thus achieved.

In the description above, for convenience, some routines may be described as receiving an argument that is a particular datum when in fact such a routine receives a pointer to the datum or even a severally indirect pointer to the datum. A person of ordinary skill in the art can make the appropriate substitution as necessary.

Of course, the program text for such software as is herein disclosed can exist in its static form on a magnetic, optical or other disk, on magnetic tape or other medium requiring media movement for storage and/or retrieval, in ROM, in RAM, or in another data storage medium. That data storage medium may be integral to or insertable into a computer system.

APPENDIX A

Alert Interface Definition and Sample Implementation

Although the interface for the Alert class is specified in the C++ language and uses the Posix.1c multithreading standard, other languages (for example, C, Java, or SmallTalk IDL) and other standards (for example, DCE threads, or Solaris ® threads) might have been chosen.

A.1 Alert Interface Definition

```
class Alert
{
        private:
                // Synchronize access to the Alert object.
                pthread_mutex_t mutex;
                pthread_cond_t cond;
                // Set if this Alert "has occurred."
                int active;
                // Alert activated if any in container set
                // is activated.
                AlertCollection container;
                // Activate all Alerts in contained set
                // if/when this Alert activated.
                AlertCollection contained;
        public:
                // Normal constructors, destructors,
                // equate operator
                Alert ( );
                Alert (const Alert &);
                virtual ~Alert ( );
                Alert & operator= (const Alert &);
                // Wake other Posix threads.
                // Broadcast Alert (awake all threads)
                // waiting on any Alert in contained list.
                void notify_all ( );
                // Block waiting for other Alerts.
                // Block till awakened by ANY Alert in
                // container list.
                void wait_for_any ( );
                // Support routines
                // Determine whether this Alert is
                // "active."
                int is_awake( );
                // Add an Alert to container class - wait4
                // mode. (Posix thread builds list of
                // Alerts to block on).
                void own (Alert *);
                // Add an Alert to contained class - alert
                // mode. (Notify all Alerts in list when
                // triggered).
                void make_member (Alert *);
};
```

A.2 Alert Implementation

The following code shows possible implementation of some of the functions specified in the Alert interface.

```
// Determine if alert notification has been issued.
int Alert::is_awake ( )
{
        return (active);
}
        // Add new Alert to group which must be notified
        // when you are
void Alert::make_member(Alert *alert)
{
        if (alert != this)
        contained.add (*alert);
}
        // Add new alert to group that can be waited for.
void Alert::own (Alert *alert)
{
        if (alert != this)
        {
                // Add self as an owner of supplied Alert.
                container.add (*alert);
                // Let this Alert know (so you will be
                // notified when it is).
                alert->contained.add (*this);
        }
}
        // Notify self and all alerts which contain this
        // Alert.
void Alert::notify_all ( )
{
        Alert *alert;
        unsigned int max;
                // Lock alert.
        pthread_mutex_lock(&mutex);
        max = contained.size ( );
        for *(int i = 0; i < max;i++)
        {       // Select each Alert to notify
        if ((alert = contained.get (i)) && (alert != this))
                alert->notify_all ( );
        }
                // Identify event notification as having
                // occurred.
        active++;
                // Notify any threads waiting for this event to
                // occur.
        pthread_cond_broadcast (&cond);
                // Unlock alert.
        pthread_mutex_unlock (&mutex);
}
        // Wait for any one of a set of events to be "ready"
        // (i.e. wait for any of a set of Alerts to be
        // notified).
void Alert::wait_for_any( )
{
                // Lock alert.
        pthread_mutex_lock(&mutex);
        while (!active)
        {
                // This wait_for is not ready, i.e.,
                // no subalerts have yet been "notified."
                // Wait until signaled.
                pthread_cond_wait (&cond, &mutex);
        }
}
© Sun Microsystems, Inc. 1996
```

APPENDIX B

AlertCollection Interface Definition

The AlertCollection class encapsulates the details of an Alert collection and can be designed to be an instantiation of a multithread-safe collection template available from any number of existing object libraries, e.g., "tools.h++," available from the assignee of the current invention.

```
class AlertCollection
{
        public:
                // Normal constructors, destructors,
                // eguate operator.
        AlertCollection ( );
        AlertCollection (const AlertCollection &);
        virtual ~AlertCollection ( );
        AlertCollection & operator=
                (const AlertCollection &);
                // Addition, which returns offset.
        int add (Alert &);
                // Retrieval by index (NULL if index slot
                // "unfilled."
        Alert *get (int);
                // Removal.
        Alert *remove (int);
```

APPENDIX B-continued

AlertCollection Interface Definition

```
    Alert *remove (Alert *);
            // Get number of Alerts in collection.
    int size ( );
};
© Sun Microsystems, Inc. 1996
```

APPENDIX C

Sample Event: Thread_Exit_Event

```
        The Thread_Exit_Event class defined is a "client of"
the Alert class. Every Thread_Exit_Event object will notify
an internal Alert object when the Posix thread it represents
exits. All other threads blocking on this event will then be
awakened.
class Thread_Exit_Event
{
    private:
                // Thread identifier.
        pthread_t thread_id;
                // Wrapper function (invokes specified
                // func).
        static void *wrapper (Thread_Exit_Event *);
                // Specified function to invoke.
        void *(*function)(void *);
                // Parameter to invoked function.
        void *param;
                // Alert to "notify" when thread exists.
        Alert alert;
    public:
                // Various constructors, destructors and
                // equates.
        Thread_Exit_Event ( );
        Thread_Exit_Event (const Thread_Exit_Event &);
        virtual ~Thread_Exit_Event ( );
        Thread_Exit_Event& operator= (const
          Thread_Exit_Event &);
                // Retrieval (of Alert object).
        Alert *get_alert ( );
                // Run thread
                // (contains all pthread_create
                // parameters).
        void run
          const pthread_attr_t *,   // Thread attribute block.
          void * (*) (void *),      // Thread function.
          void *);                  // Argument to thread
                                    // function.
};
/*
 *  Thread_Exit_Event::run - spawn Posix thread, running
    wrapper function
 */
void Thread Exit_Event::run (
          const pthread_attr_t *attr,  // Thread attribute block.
          void * (*start) (void *),    // Thread function.
          void *arg)                   // Argument to thread
                                       // function.
{
                // Save thread spawn parameters.
        function = start;
        param = arg;
                // Create new thread, running wrapper function.
        pthread_create (&thread_id, attr,
          Thread_Exit_Event::wrapper, this);
}
/*
 * Thread::wrapper - invoke user supplied function. Set
   alert notification before exiting thread.
 *
 */
void *Thread_Exit_Event::wrapper (void *vp)
{
        Thread_Exit_Event *thread = (Thread_Exit_Event *) vp;
                // Invoke supplied function with supplied
```

APPENDIX C-continued

Sample Event: Thread_Exit_Event

```
                // argument.
        void *tret = (*(thread_function)) (function_param);
                // Wake all threads blocked until this event is
                // "ready"
                // (i.e. when this Posix thread of control
                // exits).
        (thread—>alert).notify_all ( );
        return (tret);
}
© Sun Microsystems, Inc. 1996
```

What is claimed is:

1. In a multithreading computer system, a method comprising:
   creating, at a user level, a collection data structure for a first thread;
   collecting representations of a first plurality of events in said collection data structure;
   initiating blocking, at said user level, said first thread based on said first plurality of events;
   receiving notification of occurrence of one or more events;
   checking whether said collection data structure includes at least one of said occurred event(s); and
   initiating unblocking, at said user level, said first thread upon occurrence of at least one event represented in said collection data structure.

2. The method of claim 1, wherein said first thread is unblocked upon occurrence of at least two events represented in said collection data structure.

3. The method of claim 1 wherein:
   said initiating blocking comprises waiting on said collection data structure; and
   said checking comprises identifying said collection data structure, thereby identifying said threads.

4. The method of claim 1 wherein a first event in said M events is one of a completion of a data I/O operation, an unlocking of a mutex, a freeing of a resource, an exit of a thread, and an exit of a subprocess.

5. A computer system comprising:
   a computer-readable storage medium storing:
      code for creating, at a user level, a collection data structure for a first thread,
      code for collecting representations of a first plurality of events in said collection data structure,
      code for initiating blocking, at said user level, said first thread based on said first plurality of events,
      code for receiving notification of occurrence of one or more events,
      code for checking whether said collection data structure includes at least one of said occurred event(s), and
      code for initiating unblocking, at said user level, said first thread upon occurrence of at least one event represented in said collection data structure; and
   a cpu coupled to said computer-readable storage medium, said cpu being configured to execute said codes in said computer-readable storage medium.

6. The computer system of claim 5, wherein said first thread is unblocked upon occurrence of at least two events represented in said collection data structure.

7. The computer system of claim 5 wherein:
   said code for initiating blocking comprises code for waiting on said collection data structure; and said code for checking comprises code for identifying said collection data structure, thereby identifying said threads.

8. The computer system of claim 1 wherein a first event in said M events is one of a completion of a data I/O operation, an unlocking of a mutex, a freeing of a resource, an exit of a thread, and an exit of a subprocess.

9. A computer program product for causing a computer system to operate in a multithreaded manner, said product comprising:
   code for creating, at a user level, a collection data structure for a first thread;
   code for collecting representations of a first plurality of events in said collection data structure;
   code for initiating blocking at, at said user level, said first thread based on said first plurality of events;
   code for receiving notification of occurrence of one or more events;
   code for checking whether said collection data structure includes at least one of said occurred event(s);
   code for initiating unblocking, at said user level, said first thread upon occurrence of at least one event represented in said collection data structure; and
   a computer-readable storage medium configured to store said codes.

10. The computer program product of claim 9, wherein said first thread is unblocked upon occurrence of at least two events represented in said collection data structure.

11. The computer program product of claim 9 wherein:
   said code for initiating blocking comprises code for waiting on said collection data structure; and
   said code for checking comprises code for identifying said collection data structure, thereby identifying said threads.

12. The computer program product of claim 9 wherein a first event in said first plurality of events is one of a completion of a data I/O operation, an unlocking of a mutex, a freeing of a resource, an exit of a thread, and an exit of a subprocess.

13. In a computer system wherein an operating system does not provide for synchronizing thread execution to events, a computer-implemented method for emulating synchronizing execution of threads, comprising:
   creating, at said user-level, an M:N relationship between M events and N threads, where M and N are greater than one;
   creating, at said user level, a collection data structure for said N threads;
   collecting representations of said M events in said collection data structure;
   suspending execution of said N threads, using said M:N relationship;
   receiving notification of occurrence of one or more events;
   checking whether said collection data structure includes at least one of said occurred event(s); and
   resuming execution of at least one of said N threads, using said M:N relationship.

14. The method of claim 13, wherein said at least one of said N threads is resumed upon occurrence of at least two events represented in said collection data structure.

15. The method of claim 13 wherein:
   said suspending comprises waiting on said collection data structure; and
   said checking comprises identifying said collection data structure, thereby identifying said N threads of control.

16. The method of claim 13 wherein a first event in said M events is one of a completion of a data I/O operation, an unlocking of a mutex, a freeing of a resource, an exit of a thread, and an exit of a subprocess.

17. The method of claim 13 wherein N=1.

18. A computer system comprising:
   a computer-readable storage medium storing:
      code for causing, at a user level, said computer system to simultaneously synchronize execution of N thread(s) of control on a plurality of M events by
         creating, at said user level, an M:N relationship between said plurality of events and said N thread(s),
         creating, at said user level, a collection data structure for said N threads,
         collecting representations of said M events in said collection data structure,
         suspending execution of at least one of said N thread(s), using said M:N relationship,
         receiving notification of occurrence of one or more events,
         checking whether said collection data structure includes at least one of said occurred event(s), and
         resuming execution of at least one of said N thread(s), using said M:N relationship; and
   a cpu coupled to said computer-readable storage medium, said cpu being configured to execute said code in said computer-readable storage medium.

19. The computer system of claim 18 wherein N=1.

20. A computer program product for causing a computer system to simultaneously synchronize execution of thread(s), wherein an operating system does not provide for synchronizing thread execution to events, said product being executed at an operating system level and a user level and comprising:
   code for creating, at said user level, an M:N relationship between a plurality of M events and N thread(s);
   code for creating, at said user level, a collection data structure for said N thread(s);
   code for collecting representations of said M events in said collection data structure;
   code for suspending execution of at least one of said N thread(s), using said M:N relationship;
   code for receiving notification of occurrence of one or more events;
   code for checking whether said collection data structure includes at least one of said occurred event(s);
   code for resuming execution of at least one of said N thread(s), using said M:N relationship; and
   a computer-readable storage medium for storing said codes.

21. The product of claim 20 wherein N=1.

22. The system of claim 14 wherein said collection data structure includes contained lists of said N threads.

23. In a multithreading computer system, a method comprising:
   creating, at a user level, a collection data structure for a first thread;
   collecting representation of at least one event in said collection data structure;
   initiating blocking, at said user level, said first thread based on said at least one event;
   receiving notification of occurrence of one or more events;

initiating unblocking, at said user level, said first thread upon occurrence of at least one event represented in said collection data structure.

24. The method of claim 23 further comprising:

waiting on said collection data structure until a notification is received; and upon receiving said notification, checking whether said collection data structure includes at least one of said occurred event(s).

25. The method of claim 23, wherein said first thread is unblocked upon occurrence of at least two events represented in said collection data structure.

26. In a multithreading computer system wherein an operating system does not provide for synchronizing thread execution to events, a method for emulating operating system synchronization at a user level, comprising:

creating, at a user level, a container alert object;

creating a plurality of M contained alert objects within said container alert object, each contained alert object representing a single event;

upon notification of a corresponding event by one of said contained alert objects, notifying all other contained alert objects within said container alert object;

blocking each of N threads on one of said contained alert objects;

initiating unblocking, at said user level, of said N threads upon notification to an alert object which each corresponding N thread is blocked on.

27. The method of claim 26 wherein said operating system is a Posix operating system.

* * * * *

UNITED STATES PATENT AND TRADEMARK OFFICE
CERTIFICATE OF CORRECTION

PATENT NO. : 6,128,640
DATED : October 3, 2000
INVENTOR(S) : Kleinman, Ronald J.

It is certified that error appears in the above-identified patent and that said Letters Patent is hereby corrected as shown below:

Claim 9, column 13,
Line 15, which contains a superfluous "at" that occurred in the amendment of July 19, 1999.

Title page,
Item [56], seven references have been omitted from the patent and they are attached on the IDS of 3/26/97.
They are as follows:

Chung, K.-M., et al., "A 'Tiny' Pascal Compiler, Part 1: The P-Code Interpreter," BYTE Publications Inc. (1978), pp. 58-65, 148-155.

Chung, K.-M., et al., "A 'Tiny' Pascal Compiler, Part 2: The P-Compiler," BYTE Publications Inc. (1978), pp. 34-52.

Thompson, K., "Regular Expression Search Algorithm," Communications of the ACM (1968), Vol. 11, No. 6, pp. 419-422.

Mitchell , J.G., et al., Mesa Language Manuel, a Xerox Corp. document

McDaniel, G., An Analysis of a Mesa Instruction Set (1982), a Xerox Corp. document Pier, A.P., A Retrospective on the Dorado, A High-Performance Personal Computer, (1983), a Xerox Corp. document Pier, A.P., A Retrospective on the Dorado, A High-Performance Personal Computer, Conference Proceedings, The 10th Annual International Symposium on Computer Architecture, Computer Society Press (1983), pp. 252-269.

UNITED STATES PATENT AND TRADEMARK OFFICE
CERTIFICATE OF CORRECTION

PATENT NO.   : 6,128,640
DATED        : October 3, 2000
INVENTOR(S)  : Kleinman, Ronald J.

It is certified that error appears in the above-identified patent and that said Letters Patent is hereby corrected as shown below:

Four U.S. patent listed on Form 892 have been omitted from the patent and they are as follows:

| Doc. No.  | Date     | Name          |
|-----------|----------|---------------|
| 5,586,318 | 12-17-96 | Toutonghi     |
| 5,598,562 | 01-28-97 | Cutler, et al.|
| 5,644,768 | 07-01-97 | Periwal et al.|
| 5,632,032 | 05-20-97 | Ault et al.   |

Signed and Sealed this

Twentieth Day of November, 2001

*Attest:*

*Attesting Officer*

NICHOLAS P. GODICI
*Acting Director of the United States Patent and Trademark Office*